Sept. 24, 1935.    D. G. SMELLIE    2,015,198
BALL BEARING
Filed July 17, 1930
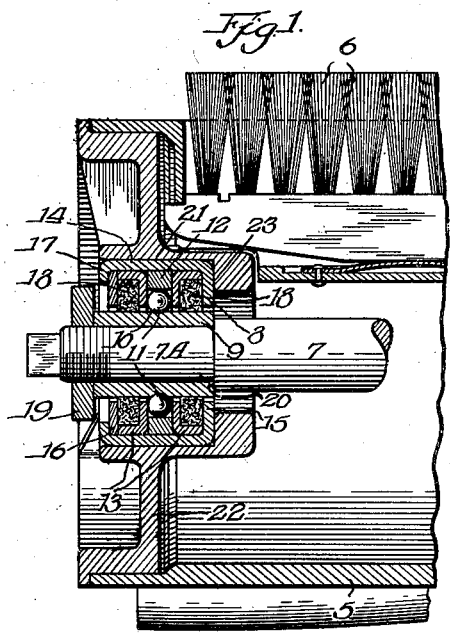
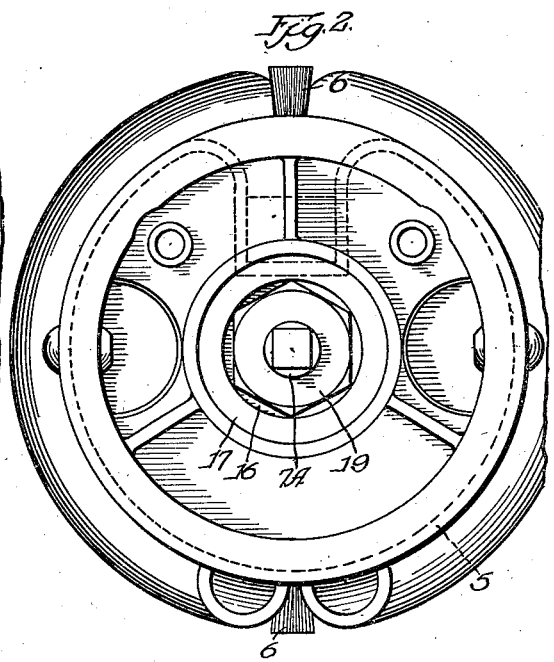
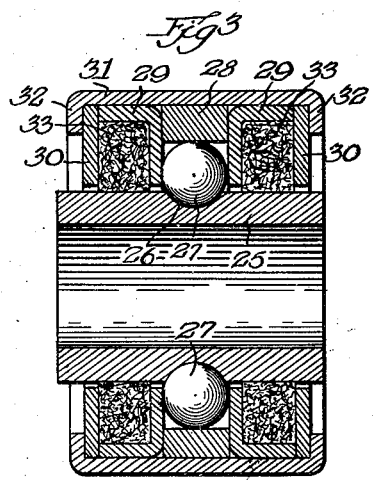
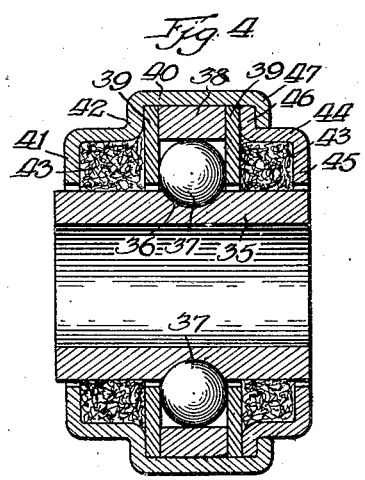
Inventor:
Donald G. Smellie
By Harry S. Demarse
Atty.

Patented Sept. 24, 1935

2,015,198

UNITED STATES PATENT OFFICE 2,015,198

BALL BEARING

Donald G. Smellie, Canton, Ohio, assignor to The Hoover Company, North Canton, Ohio, a corporation of Ohio Application July 17, 1930, Serial No. 468,557

3 Claims. (Cl. 308—187)

My invention relates to ball bearings and particularly to that type of bearing construction known as a unit-handling bearing.

My invention has for its object the provision of a new and improved ball bearing construction of increased life. A further object of my invention is to provide a simple bearing construction capable of being manufactured economically in large quantities. Still another object of my invention is the provision of a ball bearing construction of the unit-handling type in which protecting and lubricating seals form an integral part of the construction. Other and more specific objects will appear upon reading the following specification and taking into consideration the drawing annexed thereto.

Referring now to the drawing in which I disclose a preferred embodiment of the present invention, Fig. 1 discloses a preferred construction embodied in a suction cleaner agitator, that being a use for which it is particularly adapted.

Fig. 2 is a side view of the agitator and bearing construction shown in Fig. 1.

Fig. 3 is an embodiment of another preferred construction of my invention.

Fig. 4 is a third embodiment of the invention.

Referring now to the drawing and Figures 1 and 2 in particular, the preferred construction of my invention is shown embodied in an agitator for a suction cleaner. The agitator comprises a shell 5 upon which is mounted the sweeping brush indicated by the reference character 6, the agitator being rotatably mounted upon a stationary shaft 7 by means of a suitable bearing indicated generally by the reference character 8. Bearing 8 comprises an inner annular sleeve or collar 9 which frictionally seats upon the reduced end 7A of the stationary shaft. Substantially midway of its length sleeve 9 is provided with a race 10 about its periphery in which are seated balls 11, 11, as in the usual bearing. The outer race ring of the bearing 8 comprises a plurality of hard metal members which contact the balls at three points being formed of the annular rectangular cross-section hard metal ring 12, the width of which is precisely equal to the diameter of the balls, and which surrounds them, and the two annular L-section members or rings 13, 13 which contact the sides of the balls and maintain ring 12 in position relative to them. Overlying the outer race ring and maintaining it in proper assembled relation is a relatively soft metal gasket 14 which is provided with a wall 15 at one of its ends which extends inwardly and parallel to the radial walls of the rings 13, 13. At the end of the bearing opposite the inwardly extending wall 15 of gasket 14 is provided a flat ring 16 which may be of relatively soft material as it does not come into contact with the balls. Ring 16 contacts the outer end of one of the walls of the adjacent L-section ring 13. The gasket 14 is swaged against the outer side of ring 16, as at 17, and serves to maintain the parts of the outer race of the bearing and the ring 16 in assembled relation. Between the radially extending walls of the two ball-contacting annular rings 13, 13 and the wall 15 of gasket 14, in one instance, and annular ring 16 in the second instance, pockets 15 are formed within which are positioned suitable seals 18, 18 adapted to receive and retain a lubricant for the benefit of the bearing and to protect the balls and races from the exterior ambient. The entire bearing is retained on the non-rotatable shaft 7 by means of a nut 19 which is screw-threaded upon the end thereof and which serves to force the sleeve 9 against the shoulder 20 formed on said shaft. With the sleeve 9 properly positioned upon the non-rotatable shaft, the outer gasket 14 of the bearing is likewise firmly seated within the seat 21 in the end plate 22 of shell 5 and is forced against the inner end or shoulder 23 thereof.

The bearing described comprises a simple and economical construction which contains within itself the means for its own protection from the dirt and foreign matter which necessarily surrounds it when used in the application described in a suction cleaner agitator. The entire construction can be inserted and withdrawn from the agitator as a whole thereby materially assisting in the replacement when necessary.

Referring now to Fig. 3 in particular, a further modified embodiment of the present invention is disclosed which comprises an inner sleeve or race ring 25 which is provided upon its periphery with the customary race 26. Balls 27, 27 are seated in the race 26 and are contacted at three points by the enclosing ring 28 and the two annular rings 29, 29 of angular cross section, all of hardened material as described in the previous embodiment. The present embodiment differs from the aforedescribed embodiment in that annular flat rings 30, 30 are provided at both ends of the outer race thereby eliminating the necessity of the radially extending wall upon the outer gasket 31 which instead is swaged at each of its ends, as indicated at 32, 32, to provide sufficient shoulders to retain the rings 30, 30 in place and the outer race in assembled relation. In the present embodiment as in the previous, seals, indicated at 33, 33, are provided in the pockets formed by the annular L-shaped rings 29, 29 and the adjacent spaced walls which are formed in the present instance by the annular rings 30, 30.

Referring now to Fig. 4 of the drawing, a still further modified embodiment of my invention is disclosed and comprises the annular sleeve or race ring 35 provided with the race 36 within which are seated balls 37, 37. The outer race comprises, as in the previous modification, an outer enclosing ring of hardened material 38 but the L-shaped annular ring of the previous embodiments have been replaced by flat disks or plates 39, 39 of hardened metal which contact the sides of the balls. In the present modification the outer gasket, which is indicated by the reference character 40 is formed and shaped so as to provide an outer radial wall 41 which is spaced from one of the rings 39, 39 which is seated against a shoulder 42 formed in said gasket. Between the radially extending wall 41 of the gasket and the plate 39 is formed, as in the previous modification, a suitable pocket for the seal of lubricant-retaining material which is indicated by the reference character 43. At the opposite end of the bearing a complementary gasket 44 is provided which comprises a radially extending wall 45 and a shoulder 46 spaced axially therefrom which is adapted to contact the second ring or plate 39. The main gasket 40 overlies the shoulder 46 of the supplementary gasket 44 and is swaged thereover as at 47 to maintain the outer race in assembled relation. A seal, indicated by the reference character 43, is also provided in the pocket formed by the supplementary gasket 44 and the plate 39.

I claim:
1. A self-contained unitary bearing comprising an inner race ring, an outer race ring comprising a circular ring and two outwardly opening cups positioned at the sides thereof, balls positioned between said inner and said outer race rings, a seal positioned in one of said cups and an overlying gasket having at one end a radially extending portion adjacent one of said cups providing a closing wall for said seal, said gasket being swaged inwardly at its opposite end and serving to maintain said outer race ring and said seal in assembled relation.

2. A self-contained unitary bearing comprising an inner grooved race ring, an outer race ring comprising a circular ring and two circular outwardly-opening L-section rings at the sides thereof, balls positioned between said inner and outer race rings, a soft-metal gasket overlying said outer race ring provided with an inwardly-extending wall at one of its ends forming a pocket with the adjacent L-section ring, a circular disc positioned adjacent the outer end of the remaining L-section ring forming a second pocket, said disc held in position by the swaged end of said gasket, and seals positioned in said pockets.

3. A self-contained unitary bearing comprising an inner race ring, an outer race ring comprising a circular ring and two outwardly-opening L-section rings at the sides thereof, balls between said inner and outer race rings, discs at the outer sides of said L-shaped rings forming pockets therewith, seals positioned in said pockets and a gasket overlying said outer race ring and said discs maintaining said parts in assembled relation.

DONALD G. SMELLIE.